S. D. BAKER.
SAFETY RAZOR.
APPLICATION FILED FEB. 2, 1910.
988,753.
Patented Apr. 4, 1911.
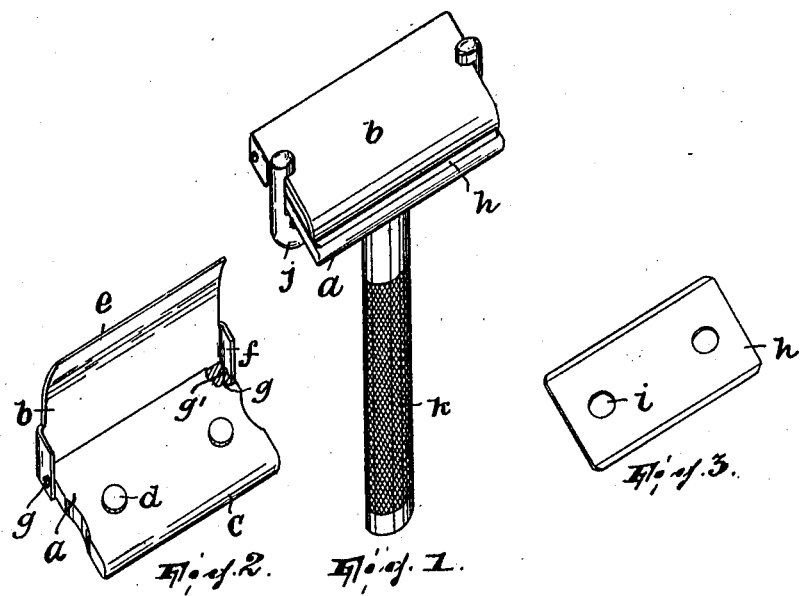
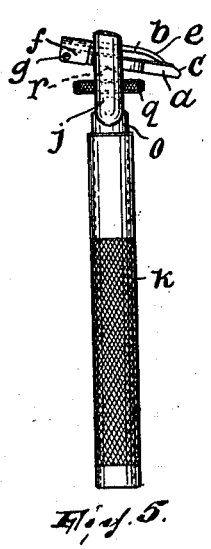
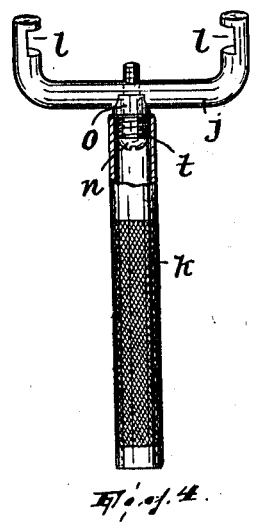
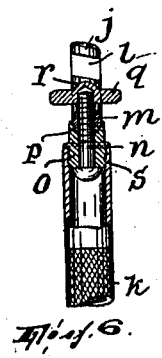
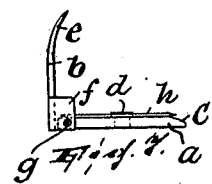
WITNESSES
INVENTOR,
S. D. Baker
BY
ATTORNEY

UNITED STATES PATENT OFFICE.

STEPHEN D. BAKER, OF NEW YORK, N. Y.

SAFETY-RAZOR.

988,753.

Specification of Letters Patent.　　Patented Apr. 4, 1911.

Application filed February 2, 1910.　Serial No. 541,489.

*To all whom it may concern:*

Be it known that I, STEPHEN D. BAKER, a citizen of the United States, residing in New York city, county of New York, and State of New York, have invented a certain new and useful Improvement in Safety-Razors; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

My present invention relates to safety razors and it has for its object to improve implements of this character with a view not only to simplify and cheapen the construction but to increase the element of safety attending their use, render the implement capable of being readily and quickly taken apart and cleaned after use and then reassembled, and make the cutting action one which will insure cleaner shaving without producing irritation, which is often attendant upon the use of safety razors heretofore devised.

In the accompanying drawing, Figure 1 is a perspective view of the improved safety razor; Fig. 2 is a similar view showing the blade gripping plates in open position; Fig. 3 is a perspective view of the blade; Fig. 4 is a front elevation of the holder member, a part of the handle thereof being shown broken away; Fig. 5 is a side elevation of the razor, assembled; Fig. 6 is a side elevation of the upper portion of the holder member, partly in section; and, Fig. 7 is a side elevation of the gripping plates in open position and showing the blade resting on the lower member.

In said drawings, $a$ and $b$ designate two blade gripping plates. The plate $a$ is a substantially rectangular metal plate having its front edge $c$ rounded off and having two upwardly projecting studs $d$. The plate $b$ is a substantially rectangular plate, somewhat thinner than the plate forming plate $a$, and having its front portion curved downwardly slightly, as at $e$, and also having at the back downwardly projecting ears $f$ which, by punching back small parts of the metal thereof, are formed with the pivots $g$; these pivots or trunnions are received by holes $g'$ drilled into the ends of plate $b$ at the back, thus forming means for hinging plate $b$ to plate $a$.

$h$ is a thin wafer blade having preferably two cutting edges and formed with the openings $i$ adapted to receive the studs $d$ when the blade is assembled with the gripping plates $a$ and $b$ as shown in Fig. 5.

The foregoing parts form the cutting member of the razor.

The holder member comprises a yoke $j$, a handle $k$, suitably secured together as hereinafter described, and means for causing the gripping plates to clamp the blade between them. The yoke $j$ is a forked-shaped part having in the arms thereof opposed recesses $l$ formed at any suitable angle to the plane of the yoke, the object being to bring the blade into the proper angle for shaving when, held by members $a$ and $b$, it is properly assembled with the yoke; said yoke has a central opening $m$ into which is tapped a screw $n$ which penetrates and holds in place a stud $o$, the stud being grooved at $p$ so as to straddle the adjoining portion of the yoke. The threaded end of the screw $n$ protrudes and onto this is screwed a nut $q$ having a central boss $r$. The handle $k$ is cylindrical and has internal threading $s$ at one end adapted to engage external threading $t$ on the stud $o$.

In assembling the parts the blade is introduced between the gripping plates; said plates are then folded together and introduced into the recesses $l$ of the yoke, the extent to which the plates are introduced being limited by the contact of the ears $f$ with the yoke. The nut $q$ is then turned to bring its boss $r$ against the outer face of plate $a$, the effect of which will be to bind the blade firmly between the gripping plates, as will be obvious. The stiffness which the exposed or cutting edge of the blade then possesses is of course dependent upon the extent to which the nut $q$ is adjusted, and it may be varied as desired.

It will be observed upon reference to Fig. 5 that plate $b$ has limited contact at its front edge-portion with the blade adjoining the acting edge, such contact being coextensive with the width of the plate and substantially of the blade; also that neither of the plates $a$ and $b$ is formed comb-like in its edge-portion, but is plain. These features have for their advantage to impart a certain rigidity to the blade, very necessary in order to prevent undue irritation and secure smooth and facile shaving, and make it possible to remove every particle of lather or moisture from the implement after use. It will also be observed that the rear or acting edge of the blade is for the time being sheathed. Again, the parts may be readily disassembled and assembled, and when disassembled may be packed flatwise in a suitable case not requiring much space.

Having thus fully described my invention, what I claim as new and desire to secure by Letters Patent is:

1. The combination of a substantially flat and rigid gripping plate, a blade bearing against one face of said plate, a second and less rigid and approximately flat gripping plate bearing against the blade, one edge of the second plate being turned inwardly toward and bearing against the blade and standing close and parallel with the cutting edge of the blade, and said second plate being pivoted to the first plate on an axis parallel with and spaced from the cutting edge of said blade, and holding means comprising a forked yoke having limited contact in each of its fork-portions with the outer face of the second plate between the pivoting axis and the inturned edge of said second plate, and a clamping device bearing against the outer face of the first plate, substantially as described.

2. The combination of a cutter member and a forked holder member, said holder member comprising a yoke having its fork-portions bearing against the relatively outer face of the cutter member, a threaded stud, a screw penetrating the stud and yoke and holding the stud to the yoke and having its threaded end protruding through the yoke toward the cutter member, a nut arranged on the protruding portion of the screw and bearing against the cutter member, and a handle removably arranged on the stud, substantially as described.

3. In a safety razor, the combination of a blade, gripping devices holding the blade between them and one of them having laterally projecting ears pivoted in the other, and a holder member comprising a forked-shaped yoke and clamping said gripping devices together, said gripping devices being received between the arms of the yoke and said ears forming stops engaging said arms, substantially as described.

In testimony, that I claim the foregoing, I have hereunto set my hand this 31 day of January, 1910.

STEPHEN D. BAKER.

Witnesses:
J. W. HAZLETT,
MAX BURL.

---

Copies of this patent may be obtained for five cents each, by addressing the "Commissioner of Patents, Washington, D. C."